United States Patent [19]

Fujibayashi et al.

[11] 4,384,762
[45] May 24, 1983

[54] FOCUSING SCREEN DEVICE

[75] Inventors: Kazuo Fujibayashi; Takashi Uchiyama, both of Yokohama; Ryoichi Suzuki, Kawasaki, all of Japan

[73] Assignee: Canon Kabushiki Kaisha, Tokyo, Japan

[21] Appl. No.: 235,645

[22] Filed: Feb. 18, 1981

[30] Foreign Application Priority Data

Feb. 18, 1980 [JP] Japan .................. 55-18820

[51] Int. Cl.³ .............................. G03B 13/28
[52] U.S. Cl. ........................ 350/286; 354/200
[58] Field of Search ............... 356/19; 354/200; 350/286, 330, 331 R, 332, 336, 337, 339 R, 362, 350/267

[56] References Cited

U.S. PATENT DOCUMENTS 4,208,115 6/1980 Proske .................. 350/336 X
4,338,012 7/1982 Matsumura et al. ........... 350/286 X

*Primary Examiner*—F. L. Evans
*Attorney, Agent, or Firm*—Toren, McGeady and Stanger

[57] ABSTRACT

A focusing screen device for use in a photographic camera or other suitable optical instrument includes a light refracting structure having a number of sets of light refracting surfaces. Each set of surfaces provides a different light refracting direction than that of the other sets. A light control assembly including an electro-optical element controls the passage of light through each surface of each set. The focusing condition of the optical system of the camera then is perceived by observing whether or not an object image changes its position, as a whole or in part, after light from the object passes through the device. For example, the position of the image may change continuously or periodically as a split line scans the image. Accordingly, the observer is able to recognize the focusing condition of the optical system with extreme clarity.

12 Claims, 23 Drawing Figures

FIG.4a — (WITH NO VOLTAGE APPLIED)
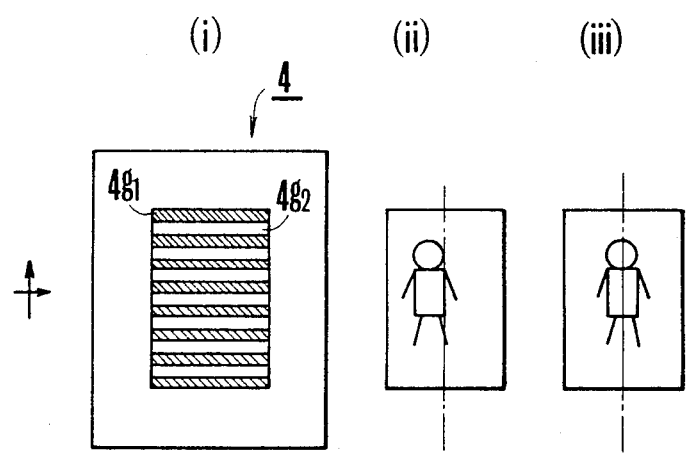
FIG.4b — (WITH VOLTAGE APPLIED)
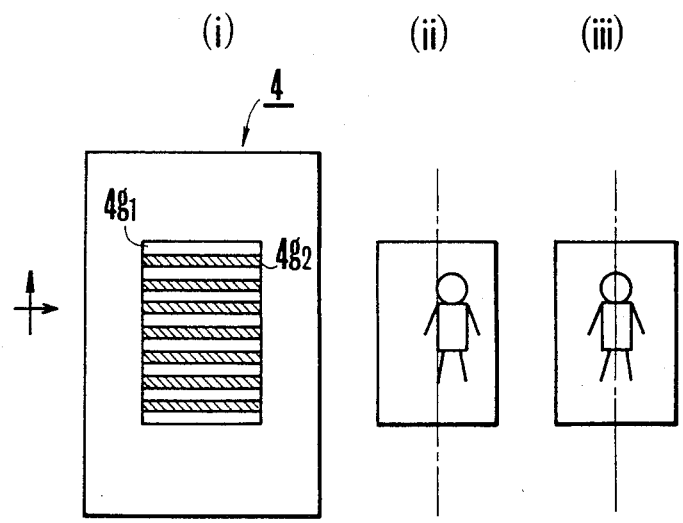

F I G.10a
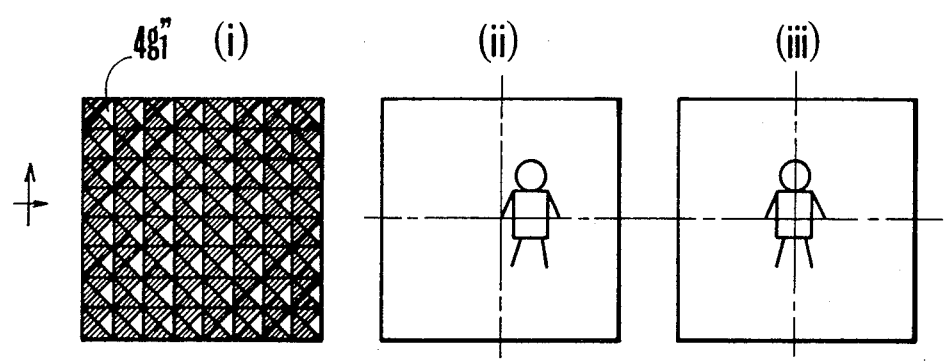
F I G.10b
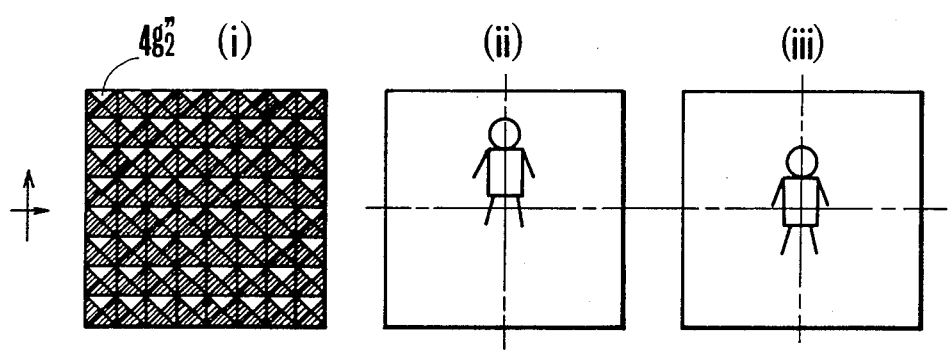

FOCUSING SCREEN DEVICE

BACKGROUND OF THE INVENTION

1. Field of the Invention

This invention relates to focusing screen devices suited for use in optical instruments which necessitate focus adjusting operation, such as photographic cameras, and more particularly to focusing screen devices which enable the observer to recognize the focus adjusting condition of the optical system by discrimination of whether or not the image is shifted at least in part.

2. Description of the Prior Art

Conventional focusing screens, such as those used in single lens reflex cameras, often use matted surfaces, microprisms, or split image prisms. Matted surfaces and microprisms have the disadvantage that the user must be experienced in discriminating between a sharp focus condition and an out-of-focus condition because the sharpness of the image formed thereon must be observed directly. On the other hand, a split-image prism does not require as much experience and focusing is comparatively simple. However, because the image is split at only one line segment when the image is out-of-focus, the operator can often not use it. To ensure proper operation, microprisms and split-image prisms are often incorporated into a single focusing screen. Such a focusing screen requires proper selection of one of the two possible focusing methods depending upon the given photographic situation. Thus, it is rather difficult for a beginner to master the technique of focusing with such a screen.

Moreover, there is a device in which two optical band grooves of saw-tooth-like or peak-like cross-section are arranged to face in different directions and to be mechanically reciprocatingly movable so that the field of the view of the finder is covered by either one of the band grooves at a time. Accordingly, as the two band grooves reciprocate, when the image is not in-focus, the image shifts to the left and right periodically. When a sharp focus condition is reached, the image is at a standstill. This method of achieving detection of an in-focus condition is disclosed in Japanese Patent Publication No. Sho 46-33496 (33496/1971). A device which makes it possible to detect when the image is in-focus by rotating the saw-tooth-like or peak-like cross-sectional grooves mechanically when the image is out-of-focus, and producing a standstill when the image is in-focus, is disclosed in Japanese Patent Publication No. Sho 47-20733 (20733/1972). These devices permit an operator to focus clearly and detect a proper focus simply even if the operator is a beginner.

However, because these devices require mechanical drive means to move the optical band grooves of the focusing screen, and, further, because the focusing screen travels through a large space, it is very difficult, if not nearly impossible, to incorporate such a device in a space as small as, for example, that available within a camera housing. Even if such incorporation is possible, as the focusing screen of the band grooves is driven, vibrations are produced. This raises the problem of the possibility that the focusing screen plane cannot be kept sufficiently stable to meet the particularly rigorous requirement for accuracy.

SUMMARY OF THE INVENTION

With the foregoing in mind, the present invention has for its general object to provide a novel and more advantageous focusing screen device which has overcome all the above-described drawbacks of the conventional devices.

An object of the invention is to provide an improved focusing screen device which enables an observer to realize the focus adjusting condition of the optical system with higher accuracy and reliability than was heretofore possible.

Another object of the invention is to provide a further improved focusing screen device which does not have a mechanical moving part, and therefore which is extremely adaptable to a minimization of the bulk and size of its body for a compactness. Since large components are no longer necessary, the device can be made ready for incorporation in an optical instrument such as a photographic camera despite the limitation of very little unoccupied interior space. Moreover, because of its operating without accompaniment of any mechanical vibrations and driving shocks, the device is stabilized against a change of the position of the focusing screen plane, and, therefore, a very large increase in the accuracy of focusing adjustment can be expected from its use.

To this end, according to the present invention, a focusing screen device includes light refracting means having plural sets each of a plurality of light refracting surfaces, each set of surfaces having a different light refracting direction and light control means including an electro-optical light control element for controlling the passage of light through each surface in each set, whereby when the light control element is controlled from outside, the focusing condition of the optical system is indicated in the form of whether or not the object image as a whole or in part changes its position, for example, continuously as a split line scans the image, and/or, for example, periodically, thus enabling an observer to recognize the focusing condition of the optical system with extreme clarity.

In a number of preferred embodiments of the present invention to be described more fully later, said focusing screen device operates in various modes separately or in combination, one of which is, in view of a more concrete and advantageous construction, that particularly when the optical system is out of focus, a vibrational motion is given to the image, thus performing a highly noticeable indication of the out-of-focus condition. Another mode is similar to the split-image type focusing screen, in that a split line is formed, but the position of the split line is continuously shifted, thus enabling an observer to discriminate the focusing condition of the optical system more clearly and easily than the conventional split-image type focusing screen. Still another mode is that when out of focus, the image is caused to travel along a path of a closed loop, thus giving an observer a very clear impression when the optical system is out of focus.

Though in these embodiments, the above-described light control means incorporates FE-TN (Field Effect-Twisted Nematic) type liquid crystal as said electro-optical element with polarizing plates or filters, it is of course possible to use an electro-chromic element or other suitable means as the control element.

These and other objects and features of the present invention will become apparent from the following detailed description of preferred embodiments thereof taken in connection with the accompanying drawings in which:

BRIEF DESCRIPTION OF THE DRAWINGS

FIGS. 2 to 4 show a first embodiment of the present invention in which FIG. 2 is a sectional view of a focusing screen device, FIG. 3 is an exploded perspective view of the device of FIG. 2, FIG. 4(a) is a plan view of the polarizing plate of FIG. 3 in a position where no voltage is applied and pictorial representations of the view-field of the finder when in the out-of-focus and in-focus conditions, and FIG. 4(b) is a similar view and similar representations when a voltage is applied.

FIGS. 6 to 8 show a second embodiment of the present invention in which FIG. 6 is an exploded perspective view of a focusing screen device.

FIGS. 9 to 13 show a third embodiment of the present invention in which FIGS. 10(a), 10(b), 10(c) and 10(d) are plan views of the prism element assembly in four different operative conditions where one of the faces of each prism element are respectively selected to pass light therethrough with the resulting pictorial representations of the field of view of the finder. FIG. 12 is a diagram of a drive circuit for the liquid crystal cell of FIG. 9, and FIG. 13 is a pulse timing chart of the various output signals of the circuit portions of FIG. 12.

DETAILED DESCRIPTION OF THE PREFERRED EMBODIMENTS

Figure 1:
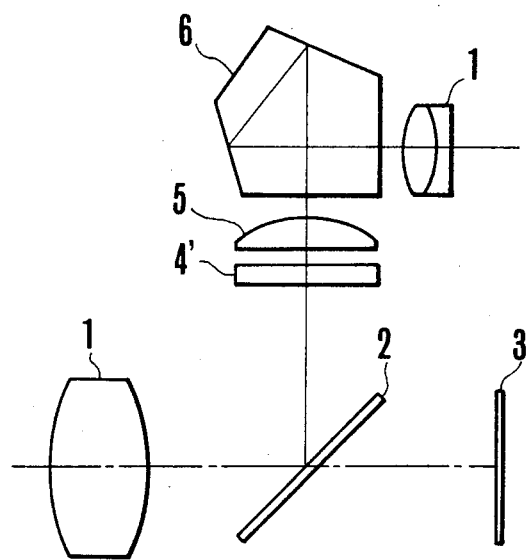
FIG. 1 is a schematic sectional view of an optical system in a single lens reflex camera taken as an example of application of the focusing screen device of the present invention.

Referring first to FIG. 1 there is schematically shown a single lens reflex camera chosen as an example of an optical instrument to which the focusing screen device of the invention is applicable. FIG. 1 shows a photographic objective 1; a reflex mirror 2; a photographic film 3; a focusing screen 4; a condenser lens 5; a pentaprism 6; and an eye-piece 7. Light from an object to be photographed enters through the objective lens 1 and after reflection from the mirror 2 is focused on the focusing screen 4'. An image of the object formed on this focusing screen can be observed through the condenser lens 5, pentaprism 6 and eye-piece 7. When an exposure is made, the reflex mirror 2 is flipped upward so that the light entering through the objective 1 is focused through an opened shutter (not shown) on the film 3, and the film 3 is exposed to an image equivalent in sharpness to that on the focusing screen 4'.

FIGS. 2 to 5 show a first embodiment of the present invention where motion of the image is vibrational, and the blocking and unblocking of the light is carried out by a liquid crystal cell.

Figure 2:
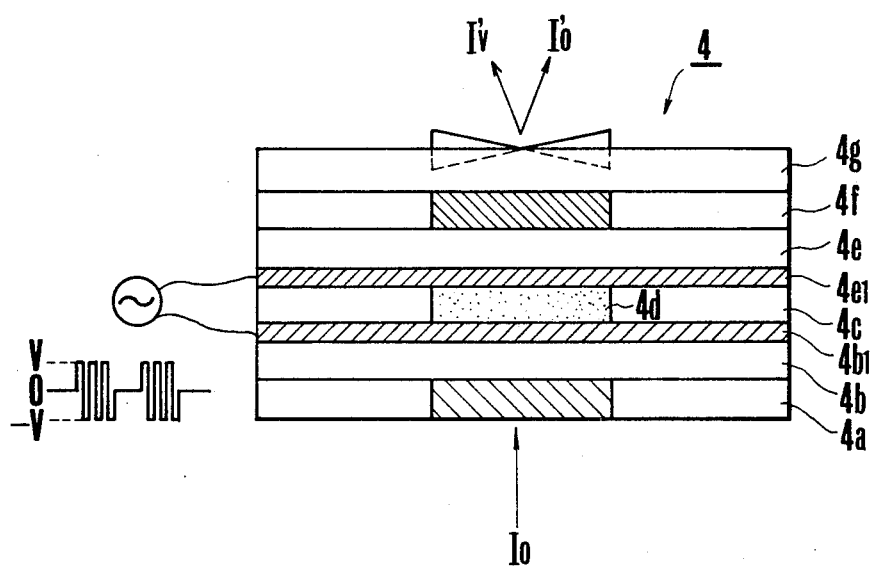
Figure 3:
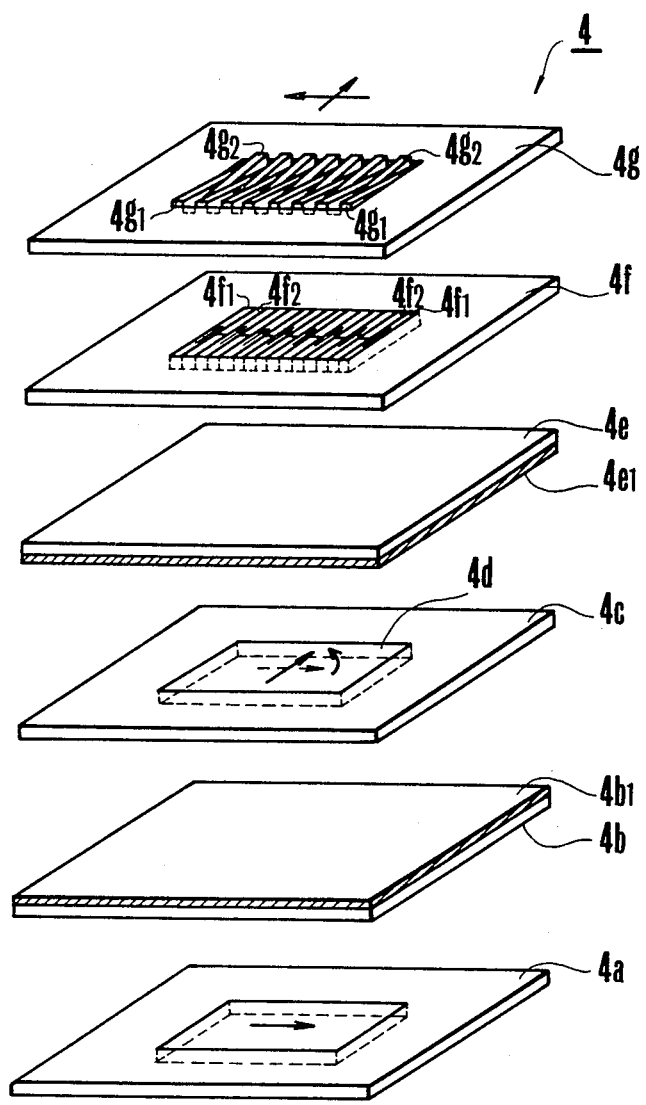

FIG. 2 shows an example of a practical focusing screen device of the present invention which can be substituted for the focusing screen 4' of FIG. 1, and FIG. 3 shows this device as disassembled. This focusing screen device is generally indicated as 4, and comprises, in a direction from the reflex mirror 2, a linear polarizing plate $4a$, a glass substrate $4b$ with a transparent electrode $4b_1$ formed thereon, a transparent insulating plate $4c$ containing a transparent liquid crystal material $4d$ in a central rectangular region thereof, a transparent electrode $4e_1$ on the lower surface of a glass substrate $4e$, a polarizing plate $4f$ having a plurality of pairs of polarizing elements $4f_1$ and $4f_2$ different in the direction of polarization from each other by 90°, and a prism plate $4g$ having an alternating arrangement of two prism elements $4g_1$ and $4g_2$ of different orientation from each other in correspondence to the above-described polarizing elements $4f_1$ and $4f_2$. The above-described two transparent electrodes $4b_1$ and $4e_1$ on the glass substrates $4b$ and $4e$ are positioned in contact with the respective surfaces of the liquid crystal cell $4d$. It is noted here that as the liquid crystal material $4d$, use is made of, for example, FE-TN (Field Effect-Twisted Nematic) type material.

The transparent electrodes $4b_1$ and $4e_1$ are supplied with an alternating voltage as shown in FIG. 2 at the left hand lower corner thereof. When the voltage is at zero value, the polarized face of light from the polarizing plate $4a$ is rotated in passing through the liquid crystal $4d$ depending upon the oriented state of the liquid crystal molecules, finally through 90° before it reaches the polarizing plate $4f$. On the other hand, when a voltage is applied, the liquid crystal molecules take the homogeneous orientation so that the polarized light from the polarizing plate $4f$ does not rotate in passing through the liquid crystal to the polarizing plate $4f$. There are two directions of polarization of the polarizer elements $4f_1$ and $4f_2$ in the polarizing plate $4f$. The direction for the elements $4f_2$ is the same as that of the linear polarizer $4a$, and the direction for the elements $4f_1$ is the same as that resulting from the rotation by the liquid crystal $4d$, that is, the direction of polarization through 90°. These two directional polarizer elements in each pair $4f_1$ and $4f_2$ are associated with the respective prism elements $4g_1$ and $4g_2$ of the same directionality.

The operation of the focusing screen device of such construction will be described below.

With no potential applied across the transparent electrodes $4b_1$ and $4e_1$, the liquid crystal cell $4d$ rotates the plane of polarization through 90° so that only those of the polarizer elements which have the different direction of polarization which differs by 90° from that of the polarization of the polarizing plate $4f$, in this instance, elements $4f_2$ pass the polarized light. As shown in FIGS. 4(a)-(i), therefore, only the areas corresponding to the prism elements $4g_2$ aligned with said polarizer elements $4f_2$ appear white on a dark background at the other prism elements $4f_1$. Then, when a potential is applied, the polarized light from the polarizing plate $4a$ is incident upon the opposite polarizing plate $4f$ without the change in the plane of polarization, so that only the polarizer elements $4f_1$ having the same direction of polarization as that of the polarizing plate $4a$ open to pass the polarized light. As shown in FIGS. 4(b)-(i), therefore, the other prism elements $4g_1$ in the prism plate $4g$ aligned with said polarizer elements $4f_1$, when no voltage is applied, are then selected to refract the emerging light in the different direction. As a result, when switching on and off (that is, supply and cut off) of the alternating voltage applied across the transparent electrodes $4b_1$ and $4e_1$ of the liquid crystal cell $4d$ is repeated, at a rate detectable the human eye (for example, a few Hz), the incident light Io on the focusing screen device 4 as it passes therethrough is directed to Io' and Iv' depending upon whether the voltage is absent or present respectively, as shown in FIG. 2. The exiting light changes its direction alternately at the corresponding repetition rate to that of the voltage supply, while the image in the central target area is simultaneously shifted by a distance proportional to the degree of unsharpness as in the ordinary split-image type focusing screen. When the condition of best focus is reached, the image no longer changes its position. In more detail, with the out-of-focus condition, when the voltage takes zero value, an image of a subject at the center of the target area appears in the left hand half of the corresponding area of the view-field of the finder as shown in FIGS. 4(a)-(ii), and then when the voltage takes a certain value, that image appears in the right hand half as shown in FIGS. 4(b)-(ii). When the objective 1 is brought into best focus, that image comes to the center of the area and remains at a standstill regardless of the change of the voltage applied, as shown in FIGS. 4(a)-(iii) and 4(b)-(iii).

Figure 5:
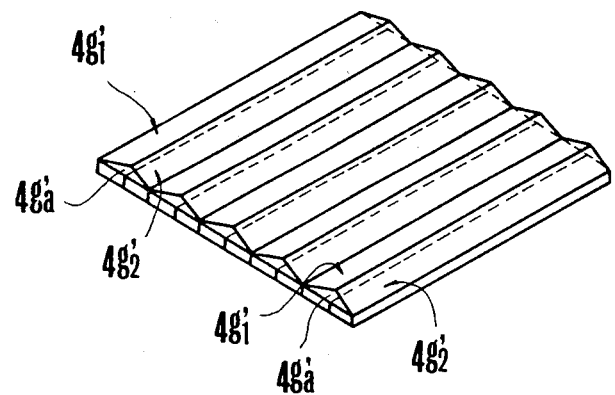
FIG. 5 is a perspective view of another example of the prism of FIG. 3.

Though the above-described embodiment employs wedge prisms as the prism elements for light refraction, elongated roof or peak shaped prism elements as shown in FIG. 5 may be used to effect an equivalent result. That is, a number of roof type prism elements $4g'a$ are arranged side by side, and their left and right roofs or inclined surfaces $4g'_1$ and $4g'_2$ are aligned with respective polarizing elements $4f_1$ and $4f_2$ of the polarizing plate $4f$. It is noted that the electric-optical light control element, use may be made, besides the liquid crystal cells, of an electro-chromic element or other suitable electro-optical transmittance control element. In the case of the electro-chromic elements, there is no need to use the polarizing plates, thereby giving an advantage that the brightness of the image on the focusing screen device is correspondingly increased.

Figure 6:
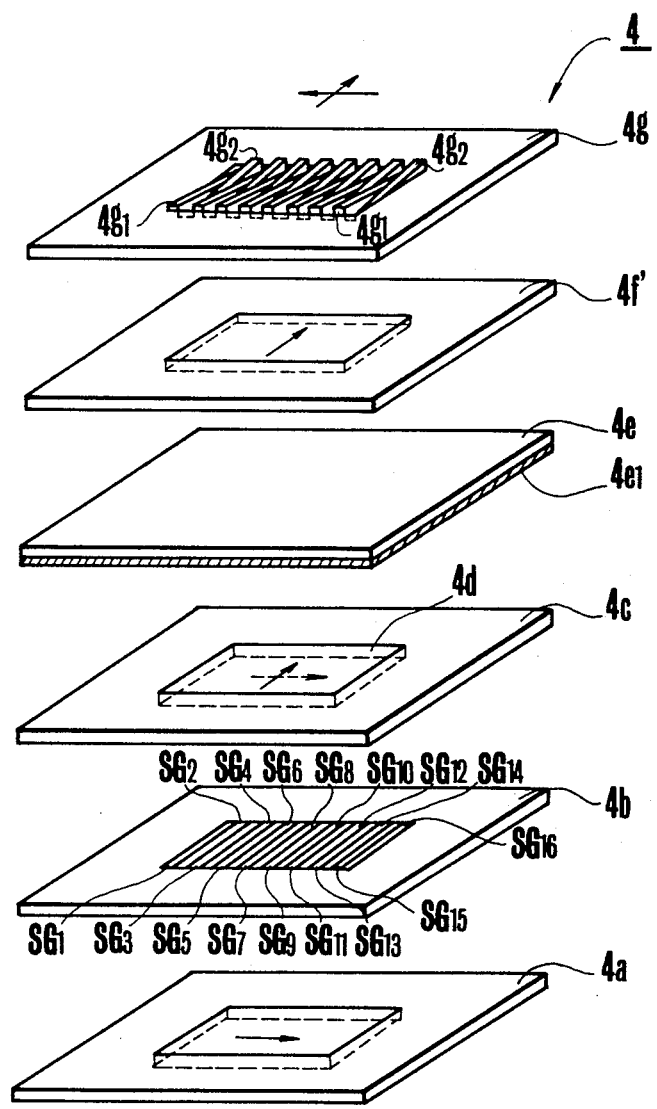

FIGS. 6 to 8 show a second embodiment of the present invention where the image in the target area is split into two parts along a horizontal line, and this horizontal line or split line is vertically moved at a moderate speed so that the observer can realize whether or not the image is split more distinctively.

FIG. 6 shows this second embodiment of the focusing screen device as comprising similar parts to those of FIG. 3 except that the patch of one of the electrodes of the liquid crystal cell $4d$ is divided into a number of mutually insulated strips to the total number of prism elements $4g_1$ and $4g_2$ in the plate $4g$, as transparent electrodes SG1 to SG16, and that the polarizing plate $4f'$ has only one uniform polarizing area of which the direction of polarization is perpendicular to that of polarization of the polarizing plate $4a$.

Figure 7A:
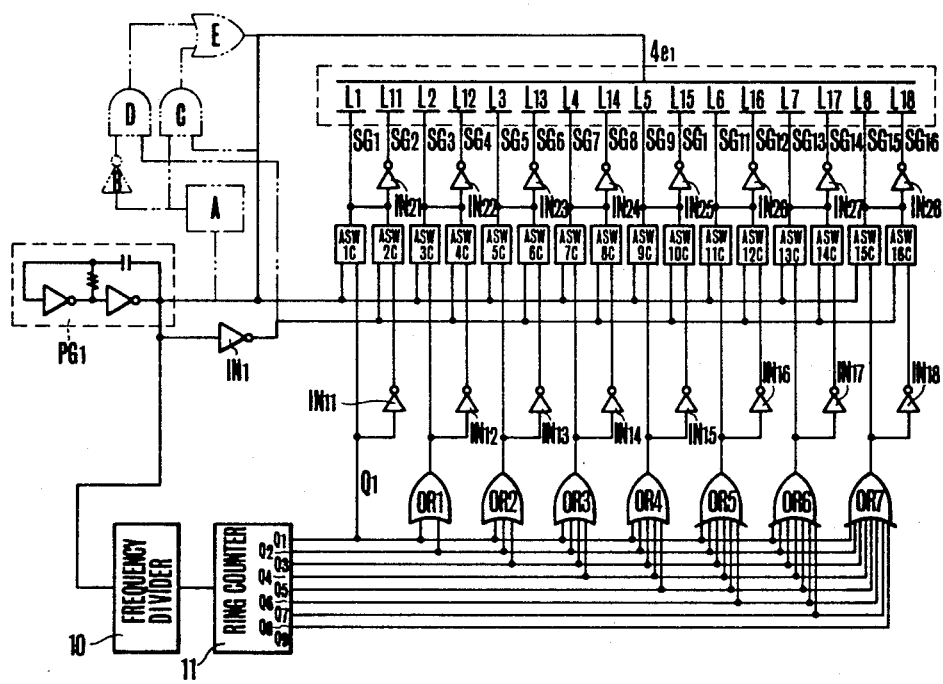
FIG. 7(a) is a diagram of a drive circuit for the liquid crystal of FIG. 6.
Figure 7B:
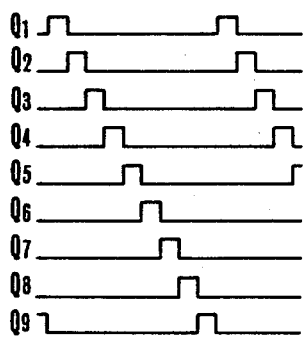
FIG. 7(b) is a pulse timing chart of the various outputs of the ring counter of FIG. 7(a)

FIG. 7(a) shows a drive circuit for the liquid crystal cell. FIG. 7(a) shows a pulse generating circuit PG1; a frequency dividing circuit 10; a ring counter 11; OR gates OR1 to OR7 connected to the outputs of said ring counter 11; inverting circuit IN11 to IN18 connected to the output Q1 of the above-described ring counter 11 and the outputs of the above-described OR gates OR1 to OR7 respectively; an inverting circuit IN1 connected to the output of the above-described pulse generating circuit PG; and analogue switches ASW1 to ASW16.

The analogue switches ASW1, ASW3, ASW5, ASW7, ASW9, ASW11, ASW13 and ASW15 are fed at their "one" inputs with the output of the above-described pulse generating circuit PG1, and at their other or control inputs with the output Q1 of the above-described ring counter 11 and the outputs of the OR gates OR1 to OR7 respectively. On the other hand, the analogue switches ASW2, ASW4, ASW6, ASW8, ASW10, ASW12, ASW14 and ASW16 each are fed at their "one" inputs with the output of the above-described inverter circuit IN1, and at their control inputs with the outputs of the above-described inverters IN11 to IN18 respectively.

Also shown are inverting circuits IN21 to IN28, the inverting circuit IN21 having an input which is connected to both of the outputs of the above-described analogue switches ASW1 and ASW2, the inverting circuit IN22 having an input which is connected to both of the outputs of analogue switches ASW3 and ASW4, the inverting circuit IN23 having an input which is connected to both of analogue switches ASW5 and ASW6, the inverting circuit I24 and I27 likewise having inputs which are connected to successive pairs of outputs of analogue switches, and the inverting circuit IN28 having an input which is connected to the both of the outputs of analogue switches ASW15 and ASW16.

The transparent divided electrodes SG1-SG16 are associated with the liquid crystal shown in FIG. 6, together with the transparent common electrode $4e_1$. The transparent electrode strip SG1 is connected to both of the outputs of the above-described analogue switches ASW1 and ASW2, the electrode strip SG3 to both of the outputs of the above-described analogue switches ASW3 and ASW4, the electrode strips SG5, SG7, SG9, SG11 and SG13 are likewise connected to the respective pairs of outputs of the analogue switches, and the electrode strip SG15 to both outputs of analogue switches ASW15 and ASW16.

On the other hand, the transparent electrode strips SG2, SG4, SG6, SG8, SG10, SG12, SG14 and SG16 are connected only to the outputs of corresponding inverting circuits IN21 to IN28.

The operation of the circuit of such construction is as follows:

The pulse generating circuit PG1 produces a train of pulses which are applied to the frequency divider 10. Responsive to the output of the frequency divider 10, the ring counter 11 produces pulse trains at its output Q1 to Q9 as shown in the timing chart of FIG. 7(b). Therefore, at the outputs of OR gates OR1 to OR7 there appear pulses as shown in the timing chart of FIG. 7(c). Now, on consideration of which condition each of the outputs assumes at a time point t1, it is at this time point t1 that the output Q1 of the ring counter 11 and the output of the OR1 take low level (hereinafter referred to "0"), and the outputs of the OR gates OR2 to OR7 take high level (hereinafter referred to "1"), and therefore that the outputs of the inverters IN11 and IN12 are "1" and the outputs of inverters IN13 to IN18 are "0". This leads to turn off the analogue switches ASW1, ASW3, ASW6, ASW8, ASW10, ASW12, ASW14 and ASW16 turning off, and the analogue switches ASW2, ASW4, ASW5, ASW7, ASW9, ASW11, ASW13 and ASW15 turning on. Therefore, applied to the transparent electrode strips SG1, SG3, SG6, SG8, SG10, SG12, SG14 and SG16 are pulses of opposite phase to that of the output pulse of the above-described pulse generating circuit PG1, and at this time, the electrode $4e_1$ is fed with the output pulses of the generating circuit PG1 with the result that a substantial alternating voltage is applied to the liquid crystal areas L1, L2 and L13 to L18, and these liquid crystal areas are turned on. On the other hand, applied to the transparent electrode strips SG2, SG4, SG5, SG9, SG11, SG13 and SG15 are pulses of the same phase as that of the output pulses of the above-described pulse generating circuit PG1, and this applied pulse is of the same phase as that of the pulse applied to the electrode $4e_1$ with the result that the voltage applied to the liquid crystal areas L11, L12, L3 to L8 is no longer alternating, and therefore these liquid crystal areas are turned off. The ON and OFF states of the entire surface of the liquid crystal cell are shown in FIGS. 8(a)-(i). Since the liquid crystal surface areas L1 to L8 and L11 to L18 correspond to the prism elements $4g_1$ and $4g_2$ in the plate $4g$, the image appears to be split along a horizontal line coincident with the boundary between the liquid crystal areas L12 and L3 as shown in FIGS. 8(a)-(ii).

Figure 7C:
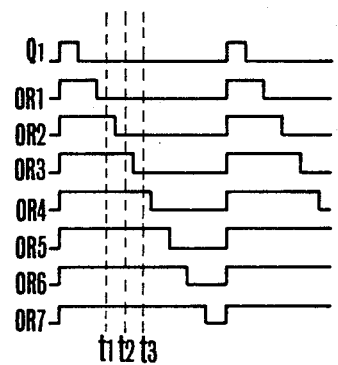
FIG. 7(c) is a pulse timing chart of the various outputs of the OR gates OR1 to OR7 of FIG. 7(a).
Figure 8A:
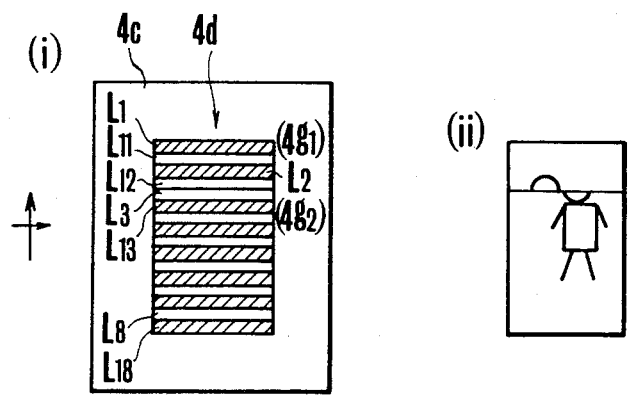
FIGS. 8(a), 8(b) and 8(c) are plan views of the liquid crystal cells in operative conditions at time points t1, t2 and t3 in FIG. 7(c) respectively with their corresponding pictorial representations of the field of view of the finder.
Figure 8B:
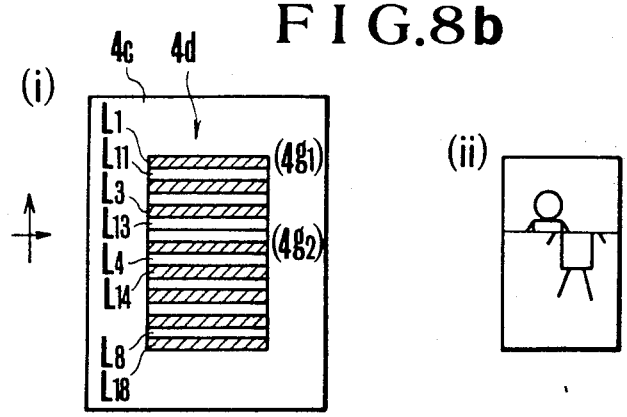
Figure 8C:
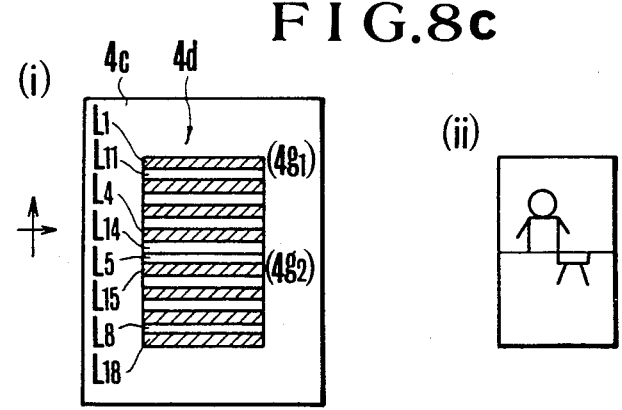

Next, at a time point t2 in FIG. 7(c), the analogue switches ASW1 to ASW16 change their ON and OFF positions with the result that the liquid crystal areas L1, L2, L3 and L14 to L18 are turned on, and the liquid crystal areas L11, L12, L13 and L4 to L8 are turned off, as shown in FIGS. 8(b)-(i). The appearance of the image is shown in FIGS. 8(b)-(ii). Then, at a time point t3, the liquid crystal assumes the ON and OFF states as shown in FIGS. 8(c)-(i) and the image appears with its split line as shown in FIGS. 8(c)-(ii).

As is evident from the above, depending upon the output periods of the ring counter 11, as shown in FIGS. 8(a), (b) and (c), the boundary line of the split image continues to go on shifting successively. Thus, an effective splitting of the image is realized. Upon adjustment of the position of the objective 1 so as not to produce a split image, the objective 1 can be sharply focused.

A third embodiment of the present invention will next be described by reference to FIGS. 9 to 13. This third embodiment operates to detect an out of focus condition by imparting into the image a circulating movement.

Figure 9B:
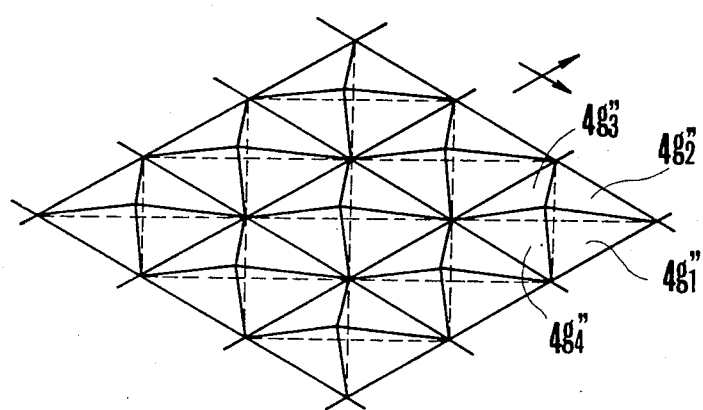
FIG. 9(b) is a perspective view in an enlarged scale of the prism elements of FIG. 9(a).
Figure 9A:
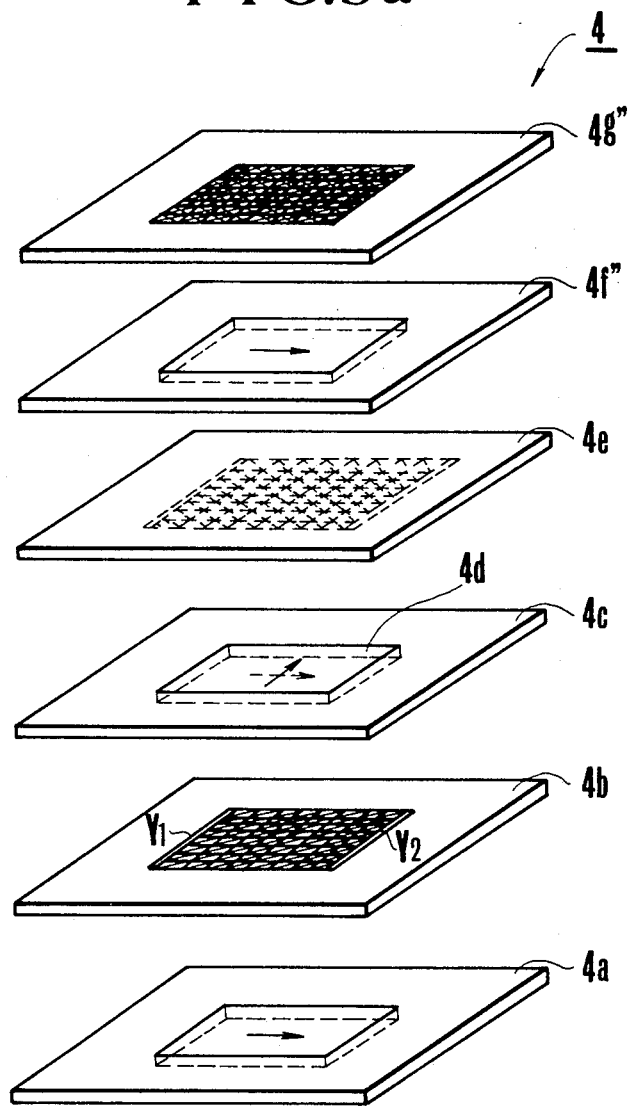
FIG. 9(a) is an exploded perspective view of a focusing screen device.

FIG. 9(a) shows a focusing screen device according to this third embodiment as disassembled. What is different from FIG. 3 appears in the electrode structure of the liquid crystal cell and the prism structure. These will be described more fully later.

Also the polarizing plate $4f'$ is constructed in the form of a uniform polarizer with the direction of polarization being the same as that of the polarizer $4a$.

FIG. 9(b) shows the details of a prism element assembly on the prism plate $4g''$ shown in FIG. 9(a). This prismed area is made up from prism elements each in the form of a regular square pyramid. In this example, the four faces of the prism element are associated with respective light control portions of the light control means operating in such a manner that light is allowed to pass through all the prism elements at their one faces, while being simultaneously blocked at all of their other faces at a given time. The positions of the light emergent faces change by rotating about the element axis, thus the entering light as it emerges caused to deviate to four different directions at an angle with the axis. When the image is not in best focus, it is caused to move in a square path from corner to corner. The larger the degree of unsharpness, the longer is the length of the side of the square path. When the condition of best focus is reached, the image no longer moves. In this case, it is required that one cycle of progressive opening and closing operation of the four light shutter elements for each prism element takes a sufficient time for the eye to perceive the motion of the image and to realize when the image stops.

Figure 10C:
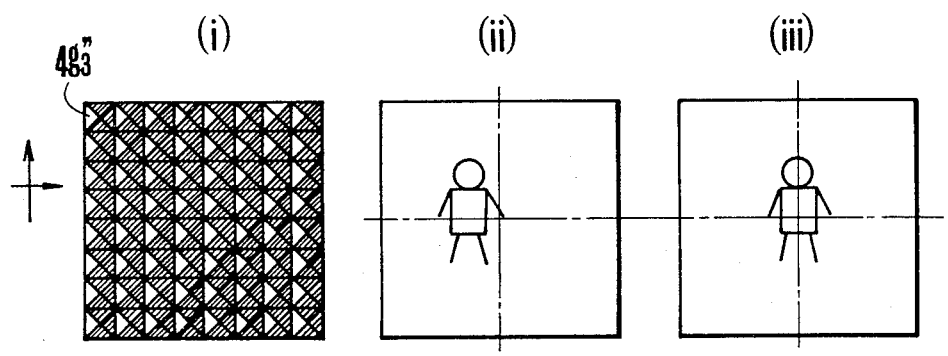
Figure 10D:
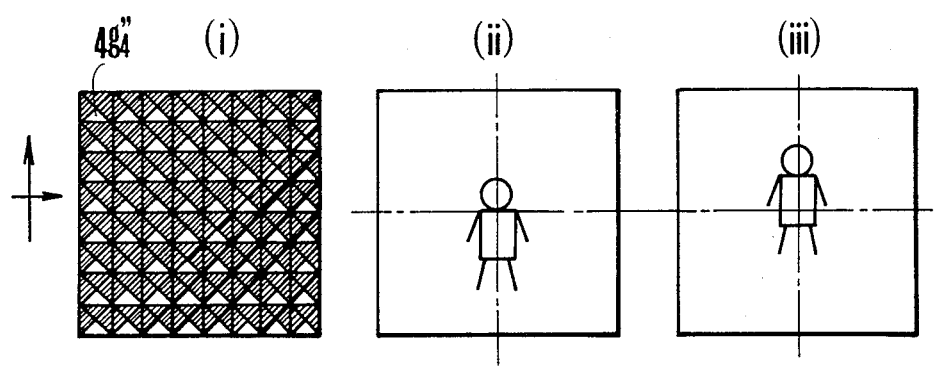

FIG. 10 shows a great number of regular square pyramid prism elements arranged in a matrix in the above-described focusing screen device 4 in four operative conditions, along with the pictorial representations the resultant field of view of the finder at FIGS. 10(a), (b), (c) and (d). FIG. 10(a) shows a light arrangement when the first faces $4g''1$ of all the prism elements are white, and the position an image of an object at the center of the target area takes when the condition of best focus is not yet reached at (ii) and has been established at (iii). FIG. 10(b) shows another light arrangement when the second faces $4g''_2$ of all the prism elements are while on a dark background of the other three faces, and what position the same object image takes when in the out of focus and in-focus conditions at (ii) and (iii) respectively. FIG. 10(c) shows another light arrangement when the third faces $4g''_3$ of the prism elements are while on a dark background of the other three faces, and what position the same object image takes when in the out of focus and in-focus conditions at (ii) and (iii) respectively. FIG. 10(d) shows another light arrangement when the fourth faces $4g''_4$ of all the prism elements are while on a dark background of the other three faces and what position the same object image takes when in the out of focus and in-focus conditions at (ii) and (iii) respectively. And, when the light arrangement is transferred from the first prism face $4g''_1$ to the second prism face $4g''_2$, then therefrom to the third prism face $4g''_3$, then therefrom to the fourth prism face $4g''_4$, and then to the first prism face $4g''a$, and so on, the image moves in tracing a square path to circulate about the center of the area of the view-field as the image is not in focus. As the degree of unsharpness increases, the total length of the path increases. As the image approaches the best focus, the path is decreased in the length, finally to a point at which the image gets standstill, as the position of the objective lens 1 is so adjusted.

Figure 11A:
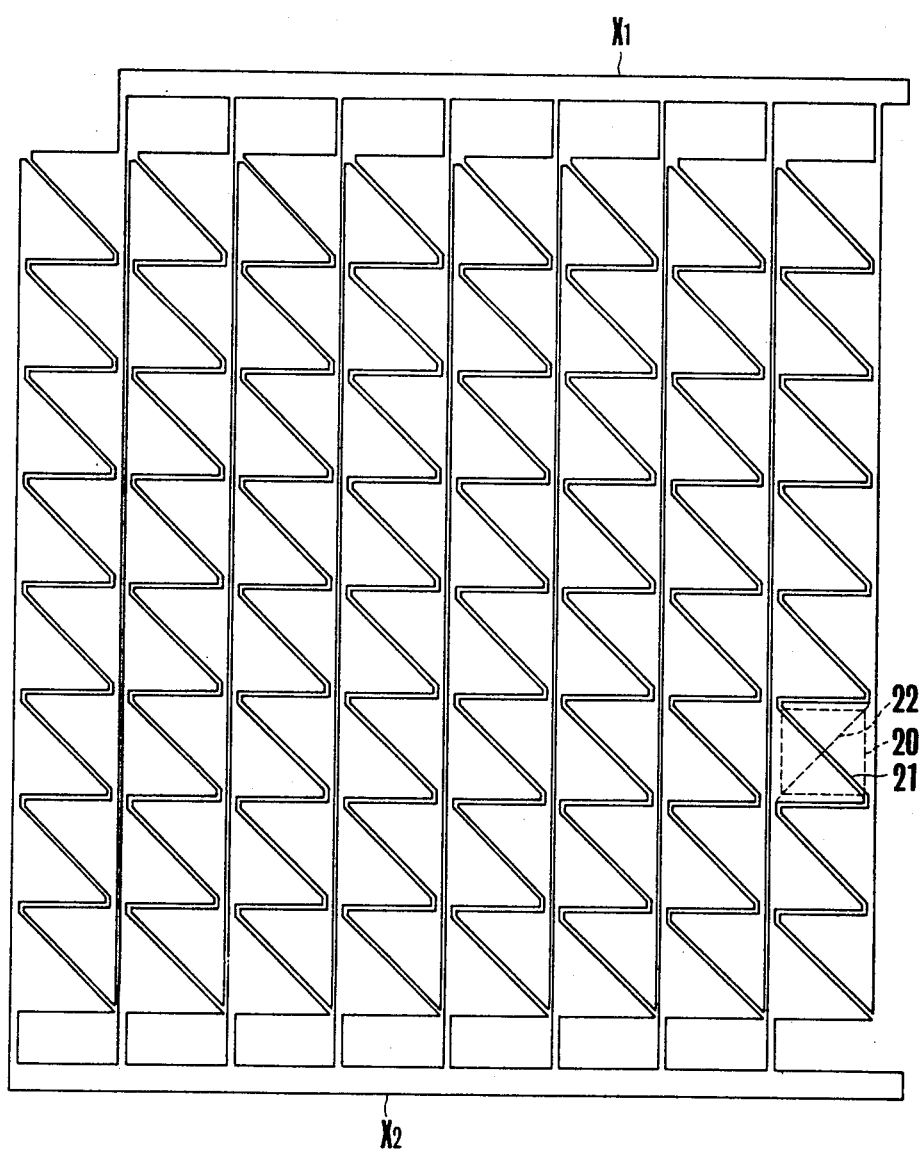
FIGS. 11(a) and 11(b) are plan views of the paired transparent electrodes of FIG. 9 respectively.
Figure 11B:
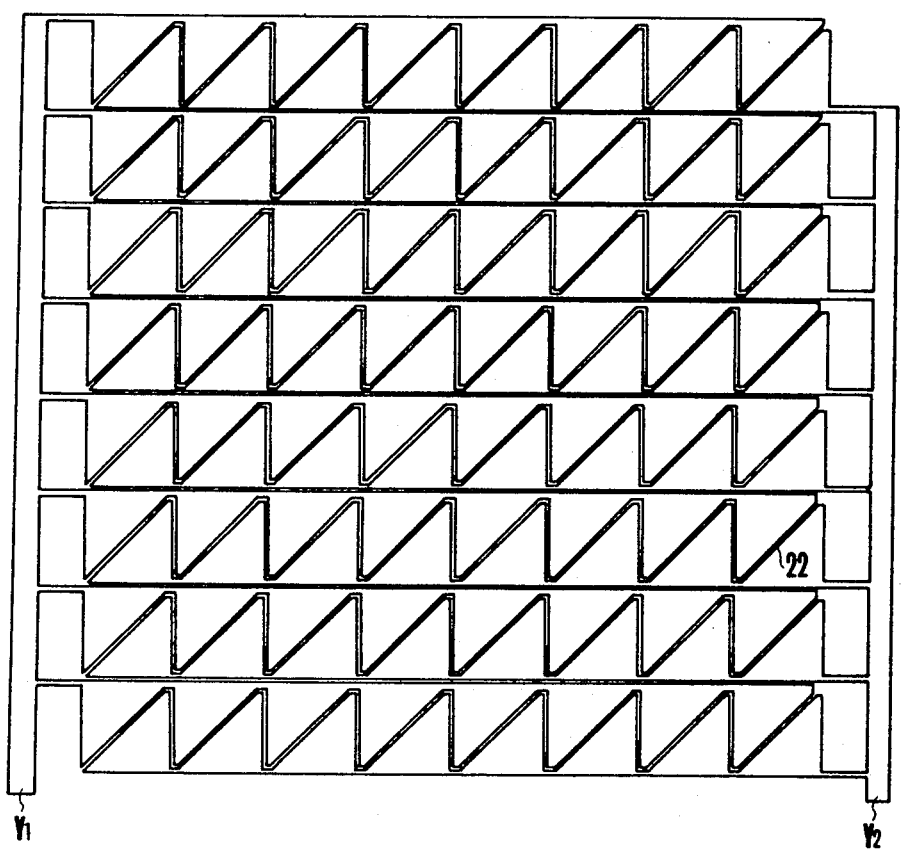

Here, FIGS. 11(a) and 11(b) show an example of the electric-optical light control element assembly usuable with the prism element assembly of FIG. 10. This light control element assembly is constructed in the form of a liquid crystal cell. In FIG. 11(a), X1 and X2 show sawtooth-like transparent electrodes formed on one glass substrate in mating relation with each other. In FIG. 11(b), Y1 and Y2 show another pair of saw-tooth-like transparent electrodes formed on the opposite glass substrate in mating relation with each other. And a liquid crystal fills the space between the transparent electrodes X1 and X2-carried glass substrate and the transparent electrode Y1 and Y2-carried glass substrate. When to assemble these two glass substrates, it is required that the inclined boundary between the two transparent electrodes X1 and X2 indicated at 21 and the inclined boundary between the two transparent electrodes Y1 and Y2 indicated at 22 cross each other. When to assemble such liquid crystal light shutter element assembly with the prism element assembly, it is required that each regular tetragon 20 defined by the opposed two of the saw teeth of the transparent electrodes X1 and X2 is just aligned to the base of the corresponding one of the regular square pyramid prism elements.

Figure 12:
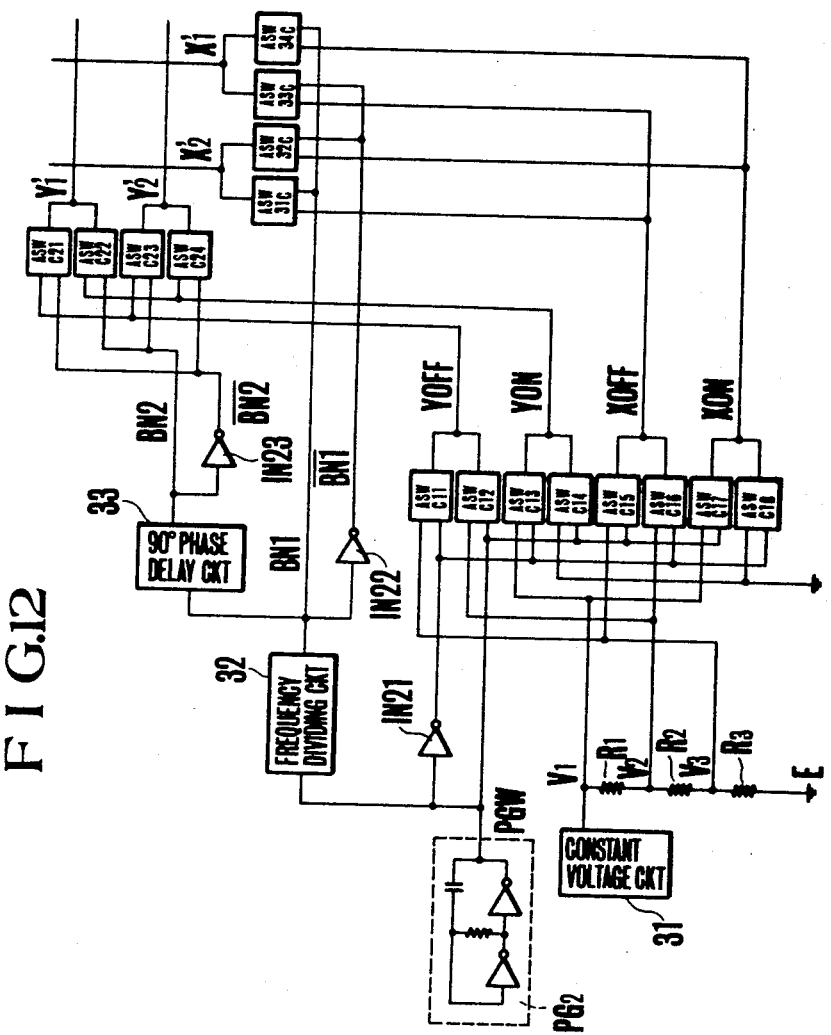

FIG. 12 shows a drive circuit for the above-described liquid crystal cell. In the figure, PG2 is a pulse generating circuit; 31 is a constant voltage forming circuit having an output terminal which is connected to a series connected circuit of three resistors R1, R2 and R3 of equal resistance value to one another. IN21 is an inverting circuit connected to the output of the above-described pulse generating circuit PG2; 32 is a frequency dividing circuit connected also to the above-described pulse generating circuit PG2. ASW11 to ASW18 are analog switches, the analog switches, the analog switches ASW11, ASW13, ASW16 and ASW18 being fed at their control inputs with the output of the above-described inverter circuits IN21 and the analogue switches ASW12, ASW14, ASW15 and ASW17 being fed at their control inputs with the output of the above-described pulse generating circuit PG2. Again, the analogue switches ASW11 and ASW15 are fed at their inputs with a voltage V3 from the junction of the above-described resistors R2 and R3, the analogue switches ASW12 and ASW16 at their inputs with a voltage V2 from the junction of the above-described resistors R1 and R2, the analogue switches ASW13 and ASW17 at their inputs with a voltage V1 from the output of the above-described constant voltage forming circuit 31, and the analogue switches ASW14 and ASW18 at their inputs with earth voltage E. 33 and IN22 are a 90° phase delay circuit and an inverting circuit respectively each connected to the above-described frequency dividing circuit 32. IN23 is an inverting circuit connected to the output of said 90° phase delay circuit. ASW21 to ASW24 are analogue switches, the analogue switches ASW21 and ASW23 being connected at their one inputs each to both of the outputs of the above-described analog switches ASW11 and ASW12, while the analog switches ASW22 and ASW24 are connected at their one inputs each to the both of the outputs of the above-described analog switches ASW13 and ASW14. Again, the control inputs of analog switches ASW21 and ASW24 are connected to the output of the above-described inverting circuit IN23, and the control inputs of analog switches ASW22 and ASW23 are connected to the output of the above-described 90° phase delay circuit 33.

ASW31 to ASW34 are also analog switches, the analog switches ASW31 and ASW33 being connected at their one inputs each to the both outputs of the above-described analog switches ASW15 and ASW16, while the analog switches ASW32 and ASW34 are connected at their one inputs each to both of the outputs of the above-described analog switches ASW17 and ASW18. Again, the analog switches ASW31 and ASW34 have control inputs which are connected to the output of the above-described frequency dividing circuit 32, and the analog switches ASW32 and ASW33 have control inputs which are connected to the output of the above-described inverting circuit IN22.

Applied to the above-described transparent electrode XI are both of the outputs of the analog switches ASW33 and ASW34, and to the transparent electrode X2 are both of the outputs of the analog switches ASW31 and ASW32. Also applied to the above-described transparent electrode Y1 are both of the outputs of the analog switches ASW21 and ASW22, and to the transparent electrode Y2 are both of the outputs of analog switches ASW23 and ASW24.

Figure 13:
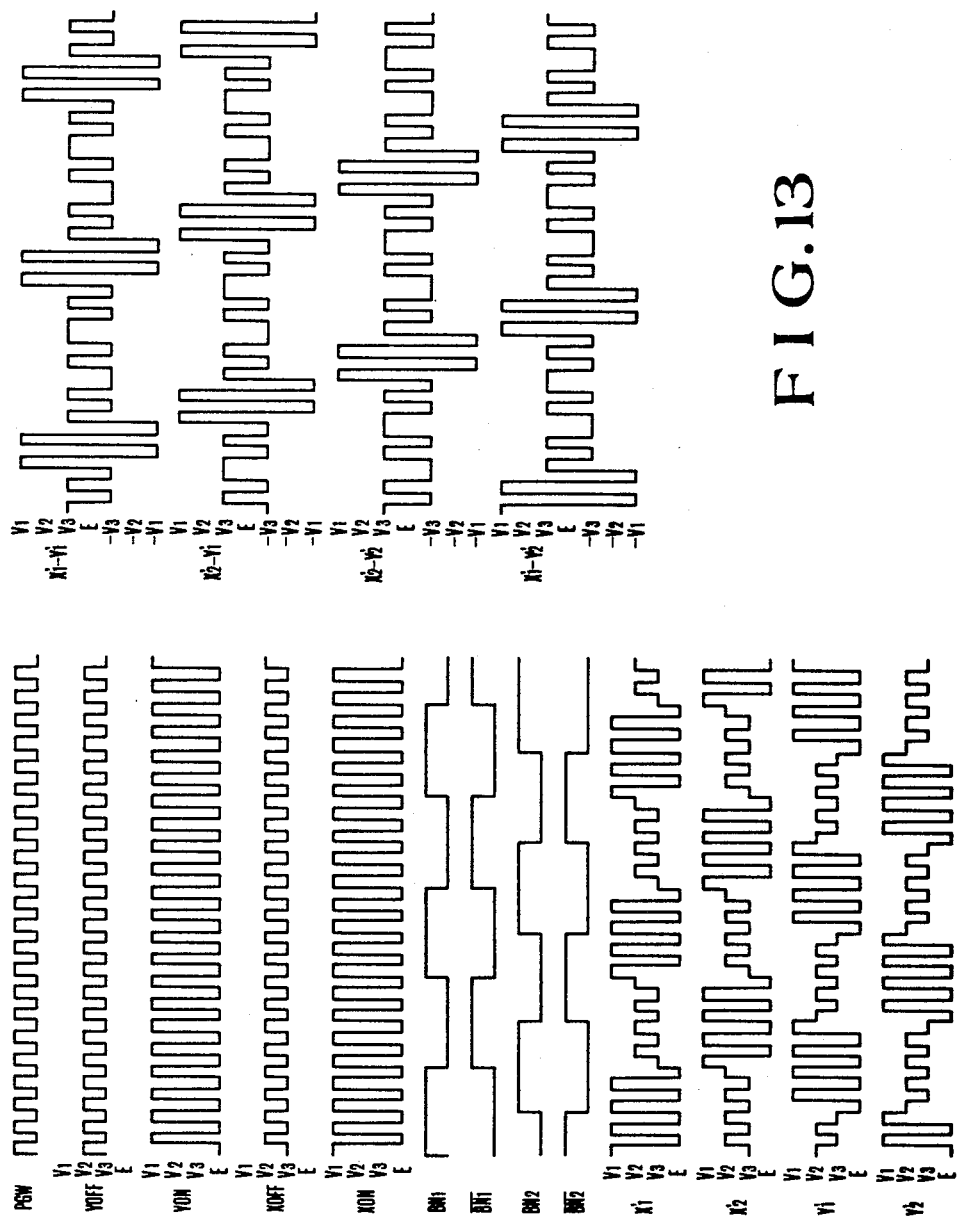

The operation of the circuit of such construction will next be described by reference to the pulse timing chart of FIG. 13. The pulse generating circuit PG2 is assumed to produce a train of pulses shown on line PGW in FIG. 13. Then, as the combined output of analog switches ASW11 and ASW12 there is produced a train of pulses of low voltage level shown on line YOFF; as the combined output of analog switches ASW13 and ASW14 a pulse train shown on line YON; as the combined output of analog switches ASW15 and ASW16 a pulse train shown on line XOFF; and as the combined output of analog switches ASW17 and ASW18 a pulse train shown on line XON. On the other hand, at this time, the frequency dividing circuit 32 and inverting circuit IN22 produces trains of pulses at a divided frequency shown on lines BN1 and $\overline{BN1}$ respectively. Also the 90° phase delay circuit 33 and the inverting circuit IN23 produces pulse trains at the same frequency but delayed in phase by 90° as shown on lines BN2 and $\overline{BN2}$ respectively.

As the combined output of analog switches ASW21 and ASW22 there is produced a pulse voltage at Y1' which is applied to the transparent electrode Y1; as the combined output of analog switches ASW23 and ASW24 there is produced a pulse voltage at Y2' which is applied to the transparent electrode Y2; as the combined output of analog switches ASW31 and ASW32 there is produced a pulse voltage at X2' which is applied to the transparent electrode X2; and as the combined output of analog switches ASW33 and ASW34 there is produced a pulse voltage at X1' which is applied to the transparent electrode X1.

Therefore, applied across the transparent electrodes: X1-Y1, X2-Y1, X2-Y2, and X1-Y2 are the respective pulsating voltages of which the amplitudes vary with time and of which the phases are deviated from each other by 90° as shown on lines X1'-Y1', X2'-Y1', X2'-Y2' and X1'-Y2' in FIG. 13 respectively. Since the V1 is so adjusted that the liquid crystal is turned on by the pulse voltage 2V1 (P-P value), and off by the pulse voltage 2V3 (P-P value), as the liquid crystal areas between the pairs of transparent electrodes are deviated in phase from each other, they are periodically turned on and off. The turning on of only those of the liquid crystal areas which lie between the transparent electrodes X1-Y1 corresponds to FIG. 10(b); the turning on of only those of the liquid crystal areas which lie between the electrodes X2-Y1 corresponds to FIG. 10(c); the tuning on of only those of the liquid crystal areas which lie between the electrodes X2-Y2 corresponds to FIG. 10(d); and the turning on of only those of the liquid crystal areas which lie between the transparent electrodes X1-Y2 corresponds to FIG. 10(a). As such is a manner of operation, when the image is not in focus, the image appears to circulate.

Though this embodiment has been described as using the regular square pyramid configuration of the prism element, the present invention is not confined thereto. Otherwise configured prisms may be used provided for regular polyhedron whatever. It is however noted that as the number of faces in a single prism element increases and the pyramid approaches a right circular cone, though the motion of the image becomes smooth, the brightness of the image on the focusing screen device gradually decreases. Therefore, there is a compromise between the number of faces and the image brightness. In general, the square pyramid or thereabout will be optimum.

As has been described in greater detail, according to the focusing screen device of the present invention, all the drawbacks of the conventional focusing screen such as awkward appearance of the image and particularly the difficult assessment of the condition of best focus of the optical system are moped up, and it is made possible for the observer to realize the focus adjustng condition of the objective lens by a very novel and advantageous method with a higher accuracy and reliability than was heretofore possible. Further, there are many additional advantages that because of the unnecessity of using particular mechanical moving parts, a further minimization of the bulk and size of the entire body and a compactness can be very readily facilitated, and there is never required a supplemental large-scale device, so that the focusing unit can be easily incorporated in a photographic camera or like optical instrument of which the interior space is extremely limited, and that since any mechanical vibrations are never accompanied, the focusing screen device is very stable and therefore a very high precision of focus adjustment can be expected from its use.

It is noted that the focusing screen device of the present invention may be modified in various ways within the scope and spirit of the present invention. Therefore, it is to be understood that the present invention is of course not limited to the features of the embodiments thereof.

As an example, for the second embodiment described in connection with FIGS. 6 to 8, the periodic shift of the image in the first embodiment described in connection with FIGS. 2 to 4 may be adapted. For this purpose, it is required to provide a circuit comprising a frequency divider (output: a few Hz) A, an inverting circuit B, AND gates C and D and an OR gate E as shown by imaginal lines in FIG. 7(a) so that the output pulse from the pulse generating circuit PG1 and the output pulse of the inverting circuit IN1 are alternately applied to the electrode 4e1. It is noted here that this circuit portion can be also used in driving the liquid crystal cell in the first embodiment described in connection with FIGS. 2 to 4. That is, concretely speaking, the output pulse of the pulse generating circuit PG1 is applied to either one of the electrodes 4b1 and 4e1, and the other is fed with the ouput pulse of the OR gate E.

What is claimed is:

1. A focusing screen device comprising:
   (a) light refracting means including a number of sets of a plurality of light refracting surfaces, said sets of surfaces having different light refracting directions relative to each other; and
   (b) light control means for controlling the passage of light through each of said surfaces in each of said sets, said control means including an electro-optical element.

2. A focusing screen device according to claim 1, wherein said light control means further includes:
   a plurality of polarizing members arranged to cooperate with said electro-optical element to control the passage of light through each of said surfaces in each of said sets.

3. A focusing screen device according to claim 2, wherein said electro-optical element has an electrically controllable light twisting function and is arranged between said polarizing members in sandwiched relation.

4. A focusing screen device according to claim 3, wherein said electro-optical element has a field effect-twisted nematic liquid crystal material.

5. A focusing screen device according to one of claims 2 to 4, further comprising:
   circuit means coupled to said electro-optical element for causing said light control means to alternately select each set of surfaces.

6. A focusing screen device according to claim 5, wherein said light refracting means has two sets of a plurality of light refracting surfaces, each of said sets having a different refracting direction and the surfaces of one of said sets are alternately arranged with respect to the surfaces of the other one of said sets.

7. A focusing screen device according to claim 6, wherein one of said plurality of polarizing members has two sets of a plurality of polarizing elements, said sets of polarizing elements having different polarizing functions from each other, each polarizing element in one of the polarizing element sets corresponding to a different one of the light refracting surfaces in one of the light refracting surface sets, and each polarizing element in the other polarizing element set corresponding to a different one of the light refracting surfaces in the other light refracting surface set.

8. A focusing screen device according to claim 5, wherein said electro-optical element in said light control means has a plurality of light control portions, each light control portion corresponding to a different one of the light refracting surfaces in said light refracting means;
   said circuit means being coupled to each of said control portions of said electro-optical element for causing said light control means to alternately select each set of surfaces through the control of said portions of the electro-optical element.

9. A focusing screen device according to claim 8, wherein said light refracting means has four sets of a plurality of light refracting surfaces, each set having a different refracting direction.

10. A focusing screen device according to claim 9, wherein said light refracting means has one matrix array of a plurality of square pyramid prisms, each face of each prism constituting a different set of said light refracting surfaces.

11. A focusing screen device according to one of claims 1 to 4, wherein said electro-optical element in said light control means has a plurality of light control portions, each light control portion corresponding to a different one of the light refracting surfaces in said light refracting means; and said device further comprises:
   circuit means coupled to each of said control portions of said electro-optical element for causing said light control means to select each light refracting surface in each set differently through the control of said portions of the electro-optical element.

12. A focusing screen device according to claim 11, wherein said light refracting means has two sets of a plurality of light refracting surfaces, each of said sets having a different refracting direction and the surfaces of one of said sets are alternately arranged with respect to the surfaces of the other one of said sets.

* * * * *